United States Patent [19]

Taguchi

[11] Patent Number: 5,708,546
[45] Date of Patent: Jan. 13, 1998

[54] TAPE CARTRIDGE

[75] Inventor: Osamu Taguchi, Miyagi, Japan

[73] Assignee: Sony Corporation, Tokyo, Japan

[21] Appl. No.: 769,002

[22] Filed: Dec. 18, 1996

[30] Foreign Application Priority Data

Dec. 21, 1995 [JP] Japan ................................. 7-333405
Dec. 11, 1996 [JP] Japan ................................. 8-331282

[51] Int. Cl.$^6$ ................................................ G11B 23/02
[52] U.S. Cl. ........................................ 360/132; 242/347.2
[58] Field of Search .............................. 242/346, 347.2; 360/132

[56] References Cited

U.S. PATENT DOCUMENTS 5,543,991   8/1996   Hashimoto ............................. 360/132
5,596,464   1/1997   Sawada .................................. 360/132

*Primary Examiner*—A. J. Heinz
*Attorney, Agent, or Firm*—Jay H. Maioli

[57] ABSTRACT

A tape cartridge housing a tape for recording information signals has a cover plate and a pull-in inlet portion. The cover plate is rotatably supported by an opening/closure mechanism and rotated in association with movement of the opening/closure mechanism. The opening/closure mechanism, in turn, is rotatably supported by a main cartridge portion having on its front side a recess into which is intruded a tape pull-out mechanism adapted to pull out the tape. The opening/closure mechanism is adapted to open or close the recess, and the free end of the cover plate has an engagement protrusion. When the engagement protrusion is disengaged from a rotation guide groove provided on the main cartridge portion, the engagement protrusion is pull-in guided by the pull-in inlet portion into engagement with the rotation guide groove.

7 Claims, 9 Drawing Sheets

TAPE CARTRIDGE

BACKGROUND OF THE INVENTION

1. Field of the Invention

This invention relates to a tape cartridge having housed therein a tape for recording information signals, such as a magnetic tape. More particularly, it relates to a tape cartridge having an opening/closing mechanism for opening or closing a recess in the front side of a cartridge main member into which is intruded a tape extraction mechanism for extracting a portion of the tape housed within the cartridge main member.

2. Description of the Related Art

There has hitherto been employed a tape cartridge having a magnetic tape wound on a pair of tape reels rotatably supported in the cartridge main member. This tape cartridge permits the pulls out of the magnetic tape, housed within the main cartridge portion, to outside the cartridge main member so that the tape extends along the front side of the cartridge main member. On the front side of the main cartridge portion, along which extends the magnetic tape of the main cartridge portion, there is formed a recess into which is intruded a tape pull-out mechanism which is a tape loading mechanism provided on the recording/reproducing apparatus for pulling out the magnetic tape on a pre-set tape running path in the recording/reproducing apparatus. The cartridge main member is provided with an opening/closure mechanism for opening/closing the front side of the cartridge main member, inclusive of the recess, for protecting the magnetic tape pulled out along the front side of the cartridge main member. During storage in which the tape cartridge is not loaded on the recording/reproducing apparatus, the opening/closure mechanism closes the front side of the cartridge main member so that the magnetic tape pulled out on the front side of the cartridge main member is not directly exposed to outside and for preventing enabling the magnetic tape to be pulled out of the cartridge main member mounted on the recording/reproducing apparatus.

The opening/closure mechanism for opening/closing the front side of the cartridge main member has a first lid for opening/closing the front side of the main cartridge portion and a second lid for opening/closing the upper surface of the recess. The first lid is substantially of U-shaped cross-section and is rotatably supported in the main cartridge portion by having pivots protuberantly formed on both sides of the front side of the cartridge main member supported by both lateral sides of the front side of the cartridge main member. The second lid is in the shape of an elongated rectangle having a pivot shaft protuberantly formed on both lateral sides of the proximal end supported by a first lid, and also having an engagement protrusion formed on each side of the free end facing the proximal end provided with the pivot engaged in a rotational guide groove formed on each side of the cartridge main member. When the first lid is rotated about the pivot as the center of rotation for opening/closing the recess formed in the front side of the cartridge main member, the second lid is rotated about the pivot as the center of rotation, with the engagement protrusion being guided by a rotational guide groove, for opening/closing the upper surface of the recess.

The opening/closing mechanism has a cover plate for being rotated in association with the movement of the opening/closing mechanism for covering the back side of the tape pulled out onto the recess. The cover plate is formed as a rectangular plate and is mounted by having a pivot formed on each side of the proximal end thereof with a fulcrumed formed by a pivot provided on the second lid and also by having an engagement protrusion formed on each side of distal end of the free end facing the proximal end provided with the pivot engaged in a rotational guide groove formed on each lateral side of the recess formed on the front side of the cartridge main member. When the first and second lids are rotated, and the first and second lids are rotated about the pivot as the center of rotation, the cover plate is rotated in association with the movement of the first and second lids, about the pivot as the center of rotation, with the engagement protrusion being guided by a rotational guide groove, for opening/closing the back side of the magnetic tape pulled out on the front side of the cartridge main member.

Referring to the drawings, a rotation guide groove for guiding the rotation of the cover plate covering the back side of the magnetic tape pulled out on the front side of the cartridge main member is explained in detail.

The portion of the rotational guide groove, engaged by the engagement protrusion of the cover plate, is formed on the lateral side wall of the recess formed on the front side of the cartridge main member, as shown in FIG. 17. The cartridge main member is formed by abutting and combining an upper main member and a lower half to each other. On the front side of the lower half 103 is formed a tape loading recess 116 into which is intruded a tape pull-out mechanism provided on the recording/reproducing apparatus configured for pulling out the magnetic tape housed within the cartridge main member. A rotation guide groove 119 engaged by the engagement protrusion provided on the free end of the cover plate is formed on the lateral wall 117 of the recess 116. This rotation guide groove 119 is formed in meandering fashion, as shown in FIG. 17, and has plural points of inflection exhibiting varying curvature. On the backside of the tape guide 118 is formed a recess 120 for preventing sink marks from being formed in the tape guide 118 when injection molding the tape guide 118 formed as one with the lateral wall 117 so as to have an arcuate surface on the outer periphery thereof.

The cover plate is formed as a plate from an elastically deformable synthetic resin. Therefore, if a cartridge is inadvertently dropped and is subjected to impact, or is thrust and subjected to pressure, it is deformed very easily. If the cover plate is deformed, the engagement protrusion on the free end thereof is disengaged from the rotational guide groove such that it is unable to be opened or closed in association with the movement of the opening/closure mechanism. Thus, if the engagement protrusion is disengaged from the rotational guide groove 119, it becomes difficult to re-engage the engagement protrusion with the rotational guide groove 119. There is also a risk that the magnetic tape housed within the cartridge main member be damaged when dismounting and re-assembling the cartridge main member.

SUMMARY OF THE INVENTION

It is therefore an object of the present invention to provide a novel tape cartridge for solving the problem inherent in the conventional tape cartridge.

It is another object of the present invention to provide a tape cartridge capable of protecting a tape housed within the main cartridge portion.

According to the present invention, there is provided an electronic equipment including a main equipment portion, a front panel and a supporting mechanism. The front panel has an operating unit having at least an operating switch. The front panel is provided on the front side of the main equipment portion. The supporting mechanism supports the front panel for rotation relative to the main equipment portion. The supporting mechanism supports the front panel for rotation between a position parallel to the front side of the main equipment portion and a position rotated from the front side of the main equipment portion. The supporting mechanism is made up of a shaft provided on one of the front panel and the main equipment portion and a bearing provided on the other the front panel and the main equipment portion. One of the shaft portion and the bearing is movable along the rotational axis.

According to the present invention, there is also provided a recording and/or reproducing apparatus for a recording medium including a main apparatus portion, a front panel and a supporting mechanism. The main apparatus portion houses a recording and/or reproducing unit for the recording medium. The front side of the main apparatus portion has an aperture for insertion and ejection of the recording medium. The front panel has an operating unit having at least an operating switch. The front panel is provided on the front side of the main apparatus portion. The supporting mechanism supports the front panel for rotation relative to the main equipment portion. The supporting mechanism supports the front panel for rotation between a position closing the aperture in the main apparatus portion and a position opening the aperture. The supporting mechanism is made up of a shaft portion provided on one of the front panel and the main apparatus portion and a bearing provided on the other the front panel and the main apparatus portion. One of the shaft portion and the bearing is movable along the rotational axis.

With the tape cartridge of the present invention, as described above, if the engagement protrusion of the cover plate rotatably supported by the opening/closure mechanism opening or closing the front side of the main cartridge portion is disengaged from the rotation guide groove formed in the main cartridge portion for guiding the direction of rotation of the cover plate, it can be re-engaged with the rotation guide groove by rotating the opening/closure mechanism. Since the main cartridge portion need not be dismounted even if the cover plate becomes disengaged from the main cartridge portion, it becomes possible to protect the main cartridge portion and the tape housed therein.

DESCRIPTION OF THE PREFERRED EMBODIMENTS

Figure 1:
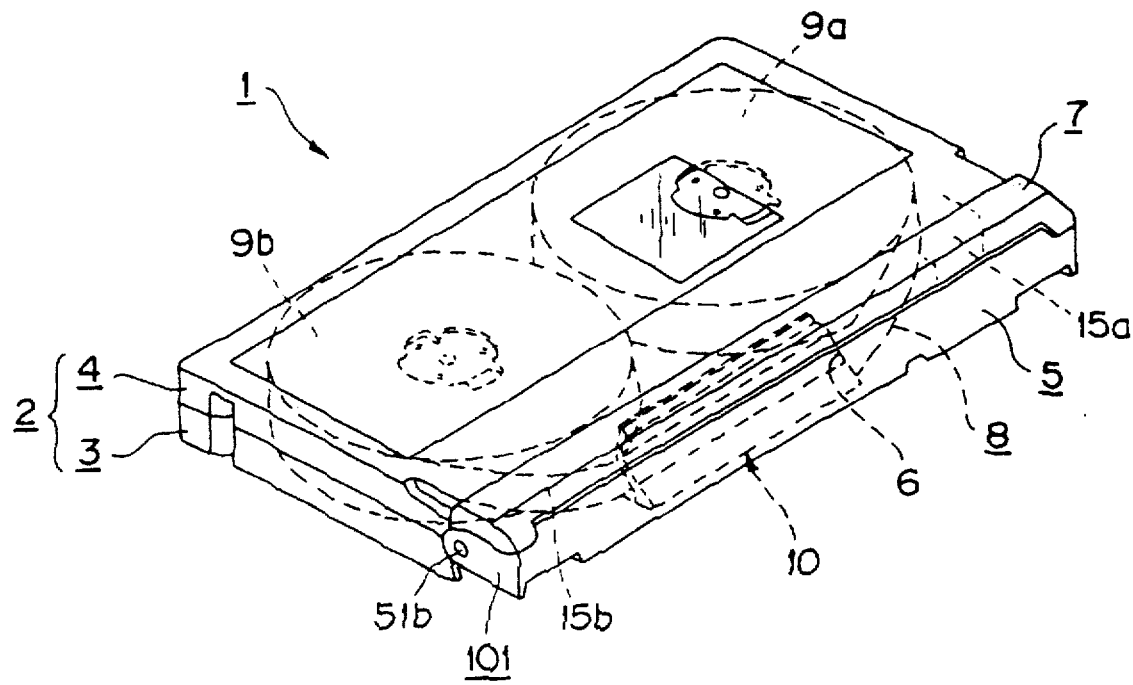
FIG. 1 is a perspective view showing a tape cartridge according to the present invention.

Referring to the drawings, an embodiment of a tape cartridge according to the present invention is explained in detail.

A tape cartridge 1 is used as a recording medium for a recording/reproducing apparatus for recording and/or reproducing digital video signals or digital information signals and includes a cartridge main member 2 made up of rectangular upper and lower halves 3, 4 formed by molding a synthetic resin material. Within the main cartridge portion 2 is rotatably mount a pair of tape reels 9a, 9b having wound thereon a magnetic tape 8. On the front side of the main cartridge portion 2 is formed a tape loading recess 10 on which is pulled out the magnetic tape 8 housed within the cartridge main member 8 and into which is intruded a tape pull-out mechanism provided on the recording/reproducing apparatus for further pulling out the thus pulled-out magnetic tape 8

On the front side of the main cartridge portion 2 are provided an opening/closure mechanism 101 made up of a first lid 5 and a second lid 8 for opening/closing the recess 10 and a cover plate 6 for covering the back side of the magnetic tape 8 pulled out on the recess 10 so as to be extended on the front side of the main cartridge portion.

An outer peripheral wall 11 is integrally formed upright on the outer periphery of the lower half 3 of the main cartridge portion 2. On both sides of the front side of the lower half 3 are formed cut-outs delimiting tape pull-out apertures 15a, 15b for pulling out the magnetic tape 8 out of the cartridge main member 2 when the lower half 3 is combined with the upper half 4 for constituting the cartridge main member 2. A bottom surface 3a of the lower half 3 is divided at the center into a left area and a right area in which arcuate-shaped tape reel housing wall sections 12a, 12b making up tape reel housing sections 13a, 13b, for rotatably housing a pair of tape reels 9a, 9b, respectively, are formed upright on the same circumference. In the bottom section 3a are formed circular reel driving shaft inserting holes 14a, 14b positioned at the center of the tape reel housing sections 13a, 13b, respectively.

Figure 4:
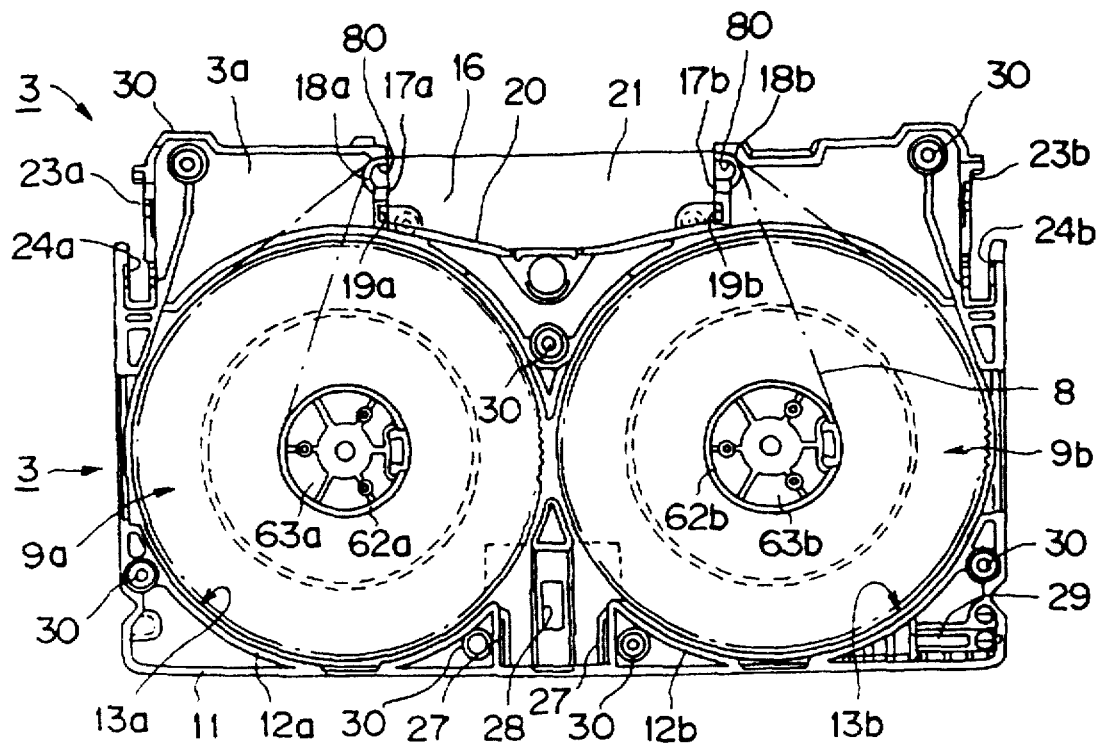
FIG. 4 is a plan view showing the state in which a tape reel is assembled into a lower half constituting a main cartridge portion of the tape cartridge shown in FIG. 1.

At a mid portion of the front side of the bottom surface 3a of the lower half 3, there is formed, such as by inwardly cutting out a portion of the bottom wall 3a, a cut-out recess 16 constituting a tape-loading recess 10 for the magnetic tape 8 formed on the front side of the cartridge main member 2. On the front side of the lower half 3 are formed an upright back side wall section 20 and a pair of side wall sections 17a, 17b extending at right angles with the back wall 20 for surrounding the cut-out recess 16 in a U-shaped configuration. The lateral wall sections 17a, 17b and the back side wall section 20 are formed to a height slightly lower than the height of the inner spacing of each lateral wall section. The outer surfaces of the lateral wall sections 17a, 17b opposite to the sides thereof facing the cut-out recess 16 are formed with tape guides 18a, 18b. These tape guides 18a, 18b are of smooth arcuate-shaped outer peripheral surfaces and formed as one with the outer lateral surface towards the distal ends of the lateral wall sections 17a, 17b, as shown in FIG. 4. The outer peripheral surfaces of the tape guides 18a, 18b are positioned inwards a distance equal to the thickness of the first lid 5 constituting the opening/closure mechanism 101 with respect to the front side edge of the lower half 3.

The tape guide units 18a, 18b are formed as one with the outer lateral surfaces of the distal ends of the sidewall sections 17a, 17b. However, the tape guide sections 18a, 18b may be set upright on the bottom wall section 3a of the lower half 3 independently of the sidewall sections 17a, 17b.

Figure 3:
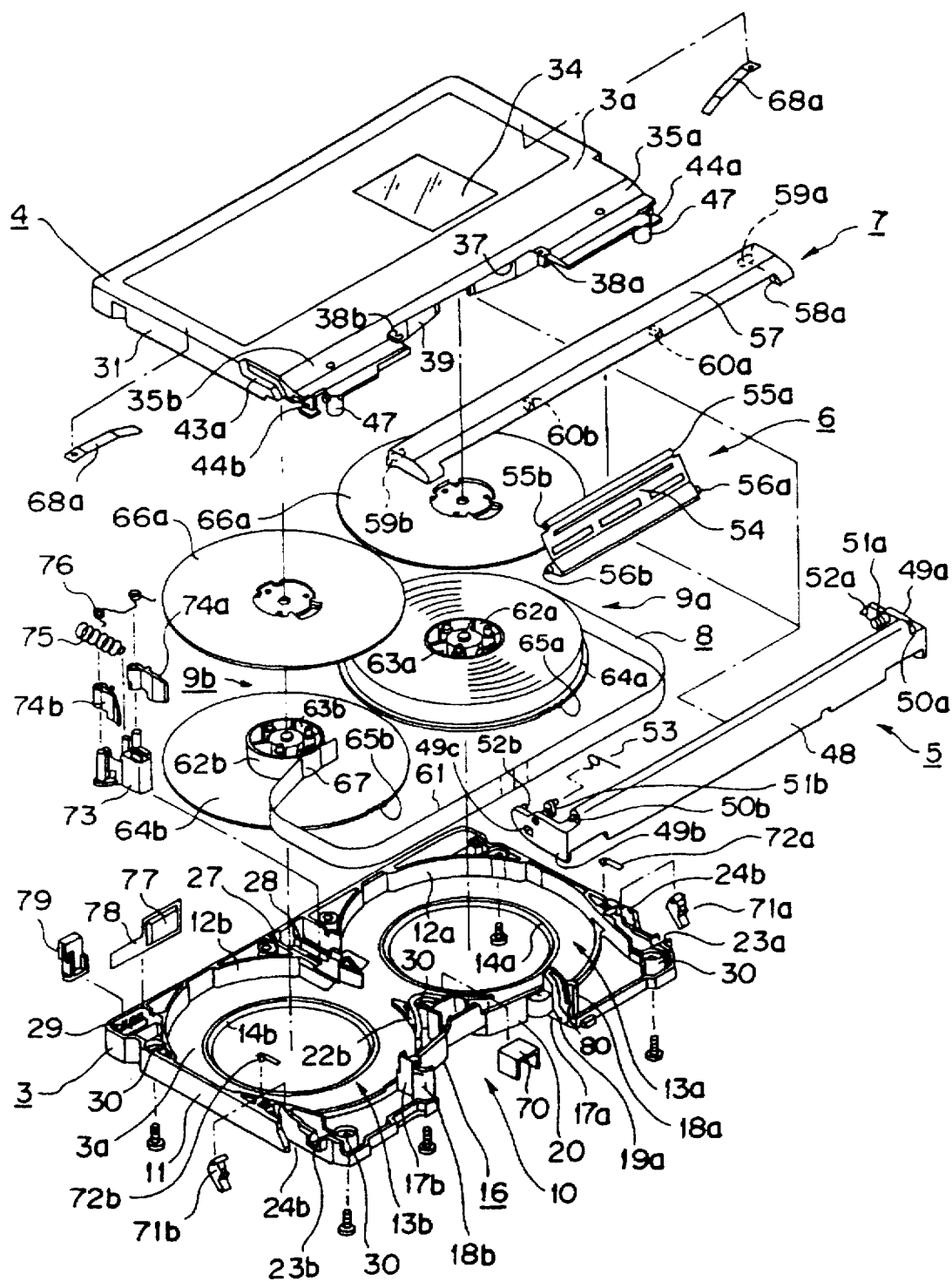
FIG. 3 is an exploded perspective view of the tape cartridge shown in FIG. 1.

On the facing sides of the sidewall sections 17a, 17b are formed rotation guide grooves 19a, 19b engaged by engagement protrusions 65a, 56b formed on the cover plate 6 and configured for guiding the rotation of the cover plate 6 as shown in FIGS. 3 and 4. These rotation guide grooves 19a, 19b are formed with a bent shape for meandering from a foremost part 19c disposed at the inner upper end of the cut-out recess 16 of the sidewall sections 17a, 17b as far as a terminal end 17d disposed at the outer lower end which is the opening side of the cut-out recess 16. That is, these rotation guide grooves 19a, 19b are formed in a substantially S-shape by combining the convexed arcuate-shaped groove and the concave arcuate-shaped groove, and delineate a curve having plural points of inflection having variable curvatures.

On mutually facing sides of the sidewall sections 17a, 17b formed with the rotation guide grooves 19a, 19b, there is formed a groove-shaped pull-in inlet portion 80 acting as a pull-in guide portion for engaging the engagement protrusions 56a, 56b of the cover plate 6 disengaged from the rotation guide grooves 19a, 19b with the rotation guide grooves 19a, 19b. Within the pull-in inlet portion 80 is formed a first inclined surface 80a one end of which is extended up to a position neighboring to the opening edges of the rotation guide grooves 19a, 19b. The first inclined surface 80a of the pull-in inlet portion 80 has its one end positioned between first ends of the rotation guide grooves 19a, 19b facing the front side of the lower half 3 and the point of inflection of the rotation guide grooves 19a, 19b adjacent to these ends.

On the upper end side within the pull-in inlet portion 80 is formed a second inclined surface 81 having its surface curved in continuation to the first inclined surface 80a. Since the curved second inclined surface 81 is formed in this manner in the pull-in inlet portion 80, there is no risk of the engagement protrusions 56a, 56b of the cover plate 6 being abutted against the upper end faces of the sidewall sections 17a, 17b to inhibit engagement thereof with the pull-in inlet portion 80 to assure smooth engagement of the engagement protrusions 56a, 56b with the pull-in inlet portion 80.

The back side wall section 20 formed on the back side of the cut-out recess 16 is formed to a height equal to about one-half the height of each sidewall section 17a, 17b and is integrally connected at both ends thereof to the sidewall sections 17a, 17b.

At a transverse mid portion of the bottom wall section 3a of the lower half 3, and towards the front side proximate to the backside wall section 20 of the cut-out recess 16, there is integrally formed a cylindrical light source inserting portion 21 provided on the recording/reproducing apparatus for detecting the tape end. On each side of the light source inserting portion 21 is formed a cut-out for transmitting the light outgoing from the light source introduced into the light source inserting portion 21. On the portion towards the front side of each lateral side of the lower half 3 are formed tape end detection holes 23a, 23b for permitting the light transmitted through a cut-out formed in the light source inserting portion 21 to be transmitted to the outside of the main cartridge portion 2, as shown in FIG. 4. On the opened upper end of the cylindrical light source inserting portion 21 is mounted a light source cover 70 of a U-shaped cross-section closing the opened upper end. With the tape cartridge 1 loaded on the recording/reproducing apparatus, the detection light output from the light source of the tape end detecting light inserted into the light source inserting portion 21 may be prevented from being diffused, while dust and dirt may be prevented from being introduced into the inside of the tape cartridge 1.

On the front side of each lateral side of the lower half 3 are formed unlock member inserting grooves 24a, 24b into which are intruded unlock operating members provided on the recording/reproducing apparatus for unlocking the lock mechanism configured for locking the opening/closure mechanism 101 rotated to the position of closing the recess 10 of the cartridge main member 2. These unlock member inserting grooves 24a, 24b are formed in a U-shaped cross-section in the front side of the lower half 3 as shown in FIGS. 3 and 4.

The lock mechanism for locking the opening/closure mechanism 101 adapted for opening or closing the recess 10 of the main cartridge portion 2 is made up of left and right lock levers 71a, 71 band thrusting springs 72a, 72b made up of spring plates thrusting the lock levers 71a, 71b. These lock levers 71a, 71b are formed in a wedge shape having a thickness approximately equal to the width of the unlock member inserting grooves 24a, 24b. These lock levers 71a, 71b are mounted on the lower half 3 by having shaft portions on the proximal sides engaged with the upper end faces of the unlock member inserting grooves 24a, 24b, while having the distal ends thereof inserted into the unlock member inserting grooves 24a, 24b so as to be rotatable about the shaft portion as the center of rotation. These lock levers 71a, 71b are thrust by thrusting springs 72a, 72b mounted on the upper surface of the lower half 3 for being biased into rotation counterclockwise in FIG. 3 about the shaft portion as the center of rotation.

Figure 5:
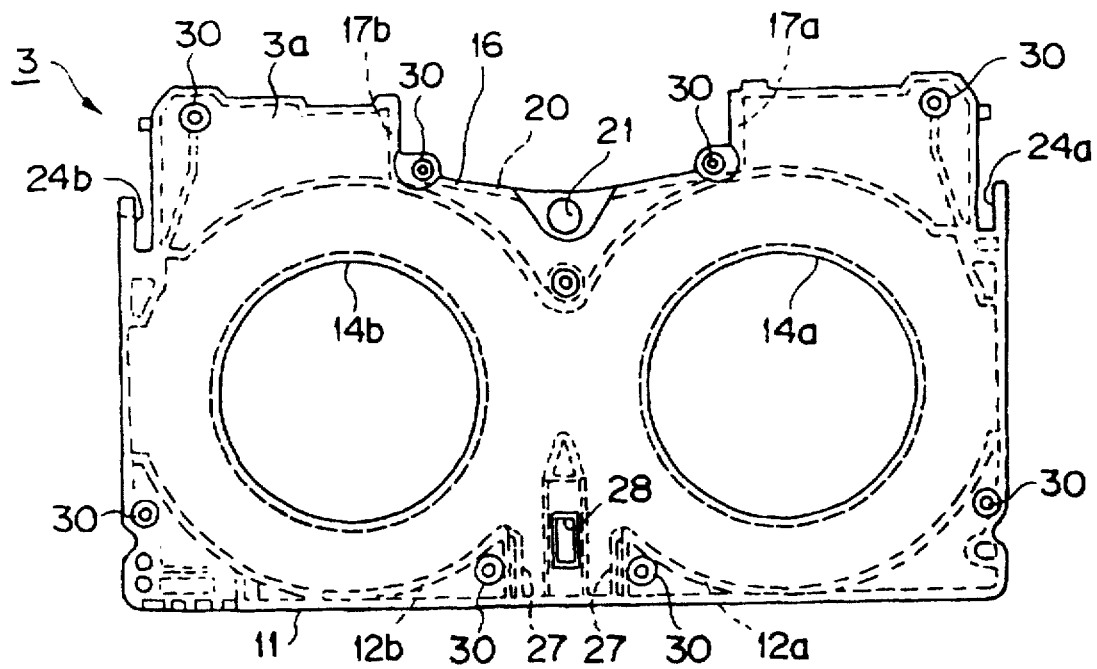
FIG. 5 is a bottom plan view showing a lower half constituting a main cartridge portion of the tape cartridge shown in FIG. 1.

On the back side of the lower half 3, facing the front side formed with the recess 10, in a substantially triangular spacing defined between the lower half 3 and the tape reel housing sections 13a, 13b, there is formed a reel lock mounting portion 27 adapted for mounting the reel lock mechanism. The reel lock mechanism mounted on the reel lock mounting portion 27 is made up of a reel lock member 73, a pair of reel lock levers 74a, 74b, a lock spring 75 and a lock lever biasing spring 76. The reel lock member 73 is slidably assembled between the guide wall sections of the reel lock mounting portion 27 and an engagement recess facing the unlock guide groove 28 formed in the bottom surface 3a of the lower half 3 facing the unlock groove 28 formed in the bottom surface 3a of the lower half 3, as shown in FIGS. 4 and 5. The reel lock member 73 is biased towards the front side under the spring force of a compression coil spring 75 arranged between it and the upstanding peripheral wall section 11. Each of the reel lock levers 74a, 74b has its one end rotatably supported by the lateral surface of the reel lock member 73. The foremost parts of the reel lock levers 74a, 74b are formed as one with engagement pawls which are biased by the spring 76 in a direction away from each other. With the reel lock member 73 being moved forwards under the spring force of the compression coil spring 75, the engagement pawls of the reel lock levers 74a, 74b are engaged with gears 65a, 65b formed on the outer peripheral edges of lower flanges 64a, 64b of the tape reels 9a, 9b under the bias of the spring 76. Thus, in the storage state in which the tape cartridge is not loaded on the recording/reproducing apparatus, the reel lock mechanism controls the rotation of the tape reel 9a in the state of being rotationally biased clockwise, while controlling the opposite side tape reel 9b in the state of being rotationally biased counterclockwise. The reel lock mechanism is driven by a reel unlock member of the recording/reproducing apparatus intruded into the unlock guide groove 28 by the loading of the tape cartridge 1 on the recording/reproducing apparatus. The reel lock mechanism releases the locked state of the tape reels 9a, 9b by the reel lock levers 74a, 74b, with the reel lock member 73 being then moved backwards by the reel unlock member against the spring force of the compression coil spring 75.

A memory element mounting portion 29 is mounted at a back side corner on the lower half 3. The memory element mounting portion 29 has assembled therein an external storage mechanism made up of a printed circuit board 78 mounting a memory element 77 and a shutter member 79 for opening and/or closing a terminal slit. On the memory element 77 of the external storage mechanism are recorded a variety of information signals or control signals, such as the design statement information for the tape cartridge 1 or the contents of the information signals recorded on the magnetic tape 8. When the tape cartridge 1 is loaded on the recording/reproducing apparatus, the shutter member 79 is moved by the shutter opening mechanism of the recording/reproducing apparatus for opening the terminal slit of the external storage mechanism. The various information recorded on the memory element 77 is read out by the reproducing means of the recording/reproducing apparatus, intruded under this condition via the terminal slit into the inside of the memory element mounting portion 29 for controlling the recording/reproducing apparatus.

On the lower half 3 are mounted plural tubular fitting portions 30 as appropriate. With the lower half 3 and the upper half 4 assembled together, the fitting portions 30 are engaged in plural mating fitting portions 47 integrally formed on a bottom portion 4a of the upper half 4. The lower half 3 and the upper half 4 are connected to each other to complete the cartridge main member 2 by set screws threaded into the inter-engaged fitting portions 30 and 47.

The upper half 4 thus connected to the lower half 3 for constituting the main cartridge portion 2 is configured such that an outer peripheral wall 31 is formed upright on the outer peripheral portion excluding the front side. The bottom portion 4a is divided at the center into a left area and a right area, as shown in FIGS. 3 and 4. In the left and right areas on the inner surface of the bottom portion 4a are integrally formed upright plural arcuate-shaped tape reel housing wall sections 32a, 32b making up peel housing sections 33a, 33b towards the upper half 4 configured for rotatably housing the tape peels 9a, 9b in cooperation with tape housing sections 13a, 13b of the lower half 3 as described above. The bottom portion 4a has a substantially rectangular-shaped window 34 for enabling part of the region of the reel housing sections 33a, 33b to be seen therethrough.

The upper half 4 has a substantially rectangular-shaped cut-out recess 37 at a mid portion of the opened front side thereof for constituting the recess 10 along with the cut-out recess 16 formed in the lower half 3. Visor-shaped forward portions 35a, 35b are protruded from both front side ends of the cut-out recess 37. The upper half 3 is formed with a pair of protruding pieces 38a, 38b on both sides of the cut-out recess 37 for protruding towards the cut-out recess 37. These protruding portions 38a, 38b are provided at the positions registering with the sidewall sections 17a, 17b of the lower half 3 and are abutted against the sidewall sections 17a, 17b of the lower half 3 in the assembled state of the upper and lower halves 3, 4 for defining the height of the inner spacing of the main cartridge portion 2, and for closing the upper end of the rotation guide grooves 19a, 19b formed in the lower half 3. The protruding portions 38a, 38b are formed with engagement grooves 39a, 39b opening into the cut-out recess 37. These engagement grooves 39a, 39b are engaged by engagement protrusions formed on the inner surface of the second lid 7 for positioning the second lid 7 to close the recess 10.

On the back side of the cut-out recess 37 in the upper half 4 is formed an upright backside wall section 40 extending from the bottom portion 4a for constituting the upstanding peripheral wall section. The backside wall section 40, while being of substantially the same height as the outer peripheral wall section 31, is slightly reduced in height at a mid portion thereof in register with the light source inserting portion 21 formed in the lower half 3. When the upper half 4 is combined with the lower half 3, the backside wall section 40 is positioned inwardly of the tape guide sections 18a, 18b towards the lower half 3. The tape guide sections 18a, 18b are formed protuberantly on a bottom wall portion 3a of the lower half 3 with the maximum height as described above. Thus the tape guide sections 18a, 18b are abutted against both ends of the backside wall section 40 first when the upper and lower halves 3, 4 are assembled together.

If the upper and lower halves 3, 4 are assembled together in a relatively offset position, the tape guide sections 18a, 18b are abutted against both ends of the backside wall section 40 to render it difficult to put the upper and lower halves together. Thus the backside wall section 40 is protuberantly formed on the bottom wall portion 4a of the upper half 4 for constituting a gap for securing a mounting tolerance between the ends of the backside wall section 40 and the tape guide sections 18a, 18b. In the assembled state of the upper and lower halves 3 and 4, the backside wall section 40 is positioned facing and in proximity to the inner lateral edge and the outer lateral surface of the tape guide sections 18a, 18b. On the inner side of the mid portion of the backside wall section 40 is integrally formed a light source cover retainer 41 in register with the light source inlet portion 21 of the lower half 3. In the assembled state of the upper and lower halves 3 and 4, the light source cover retainer 41 supports the light source cover 70 assembled to the light source inlet portion 21.

Figure 6:
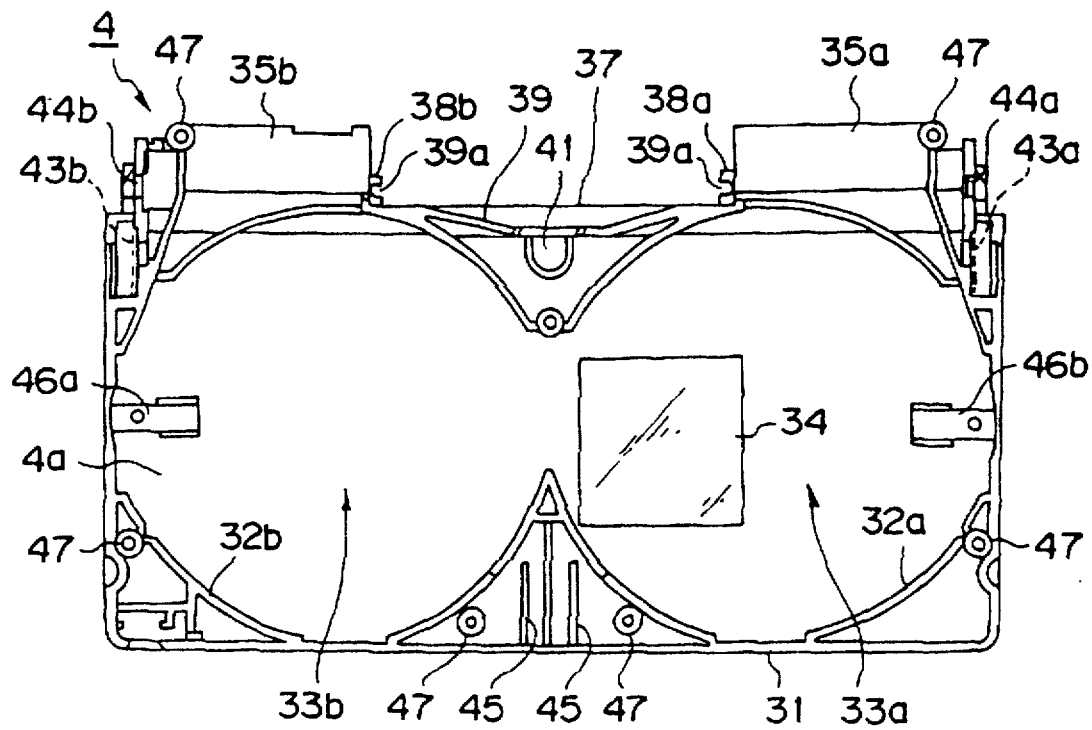
FIG. 6 is a bottom view showing an upper half constituting a main cartridge portion of the tape cartridge shown in FIG. 1.
Figure 7:
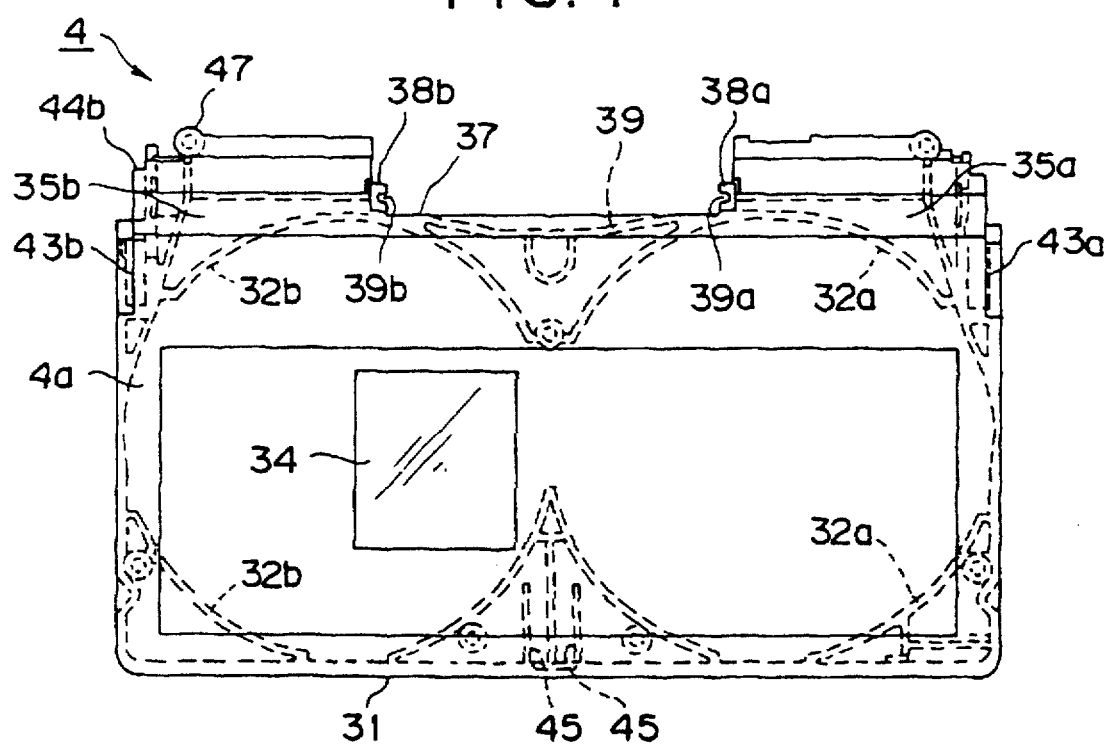
FIG. 7 is a plan view showing an upper half constituting a main cartridge portion of the tape cartridge shown in FIG. 1.

On both lateral sides of the peripheral wall section 31 of the upper half 4, extending normal to its front side, towards the front side of the upper half 4, there are formed rotation guide grooves 43a, 43b for guiding the rotation of the second lid 7, as shown in FIGS. 6 and 7. On the front side towards the lateral side of the peripheral wall section 31 of the upper half 4 are formed rotation guide grooves 43a, 43b for guiding the rotation of the second lid 7, as shown in FIGS. 6 and 7. These rotation guide groves 43a, 43b are formed as grooves gradually inclined from the lower end towards the rear of the front side of the outer peripheral wall section 31. In the front end on the lateral side of the peripheral wall section 31 of the upper half 4 are formed engagement recesses 44a, 44b of the U-shaped cross-section for rotatably supporting the first lid 5, as shown in FIGS. 3 and 6.

On the inner surface of the bottom wall portion 4a of the upper half 4 are formed reel retainer spring mounting portions 46a, 46b, as shown in FIGS. 3 and 7. These spring mounting portions 46a, 46b are formed on the centerline of the reel housing section 33a ahead of the window 34 provided in the upper half 4 and through which can be seen the state of winding on the tape reel 33a of the magnetic tape 8 housed in the cartridge main portion 2. On the retainer spring mounting portions 46a, 46b are secured reel retention springs 68a, 68b by heat-fusing one ends of the retention springs thereto. These reel retention springs 68a, 68b are pressed at distal ends thereof against the tape reels 9a, 9b and thereby pressed towards the lower half 3 for restricting the movement along the height of the tape reels 9a, 9b in the interior of the main cartridge portion 2.

On the bottom portion 4a of the upper half 4 are integrally formed plural upstanding fitting portions 47 as appropriate. The upper and lower halves 3, 4 are connected to each other integrally by set screws threaded in the fitting portions 30 and 47 for completing the main cartridge portion 2. At this time, the outer peripheral wall sections 11, 31 facing each other, tape reel housing wall sections 12a, 12b, tape reel housing wall sections 32a, 32b, sidewall sections 17a, 17b, protruding pieces 38a, 38b, backside wall sections 20, 40 and the fitting portions 30, 47 are abutted and combined with one another.

When the upper and lower halves 3, 4 are abutted to and engaged with each other, the main cartridge portion 2 is completed, in which the outer peripheral wall sections 11, 31, sidewall sections 17a, 17b, protruding pieces 38a, 38b and the backside wall sections 20, 40 constituting the backside wall of the recess 10 are abutted together for defining the recess 10 for tape loading on the front side on both sides of which are formed tape extracting apertures 15a, 15b. Within the interior of the main cartridge portion 2 are formed tape reel housing sections 13a, 13b for housing the tape reels 9a, 9b.

Figure 2:
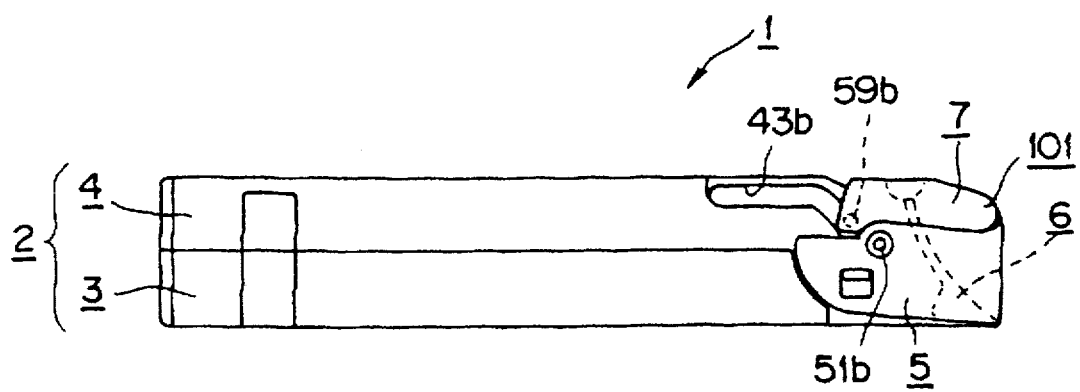
FIG. 2 is a side view of the tape cartridge shown in FIG. 1.

On the above-described main cartridge portion 2 are mounted an opening/closure mechanism 101 having a first lid 5 for opening/closing the front side formed with the recess 10 and a second lid 6 rotated in association with the movement of the first lid 5 for opening/closing the upper surface of the main cartridge portion 2 including the upperside of the recess 10, and the cover plate 7 for covering the backside of the magnetic tape 8 pulled out and extending on the front side of the main cartridge portion 2 via tape extraction apertures 15a, 15b of the cartridge main portion 2, as shown in FIGS. 1 through 3.

The first lid 5 constituting the opening/closure mechanism 101 is made up of an elongated plate-shaped major surface 48, having a length and a width sufficient to cover the front side of the main cartridge portion 2 and rotary pieces 49a, 49b formed as-one with both ends of the major surface 48 for extending the towards rear, as shown in FIGS. 2 and 3. On both lateral sides of the major surface 48 are protuberantly formed pivots 50a, 50b for extending laterally on both sides of the upper edge thereof for rotatably supporting the second lid 7. On the inner surface towards the distal end of the rotary pieces 49a, 49b are integrally formed lock pieces 52a, 52b for engaging with lock levers 71a, 71b arranged on the lower half 3. On the inner surface towards the distal ends of the rotary pieces 49a, 49b are integrally formed lock pieces 52a, 52b engaged with the rotary pieces 49a, 49b. On the pivot 51b is mounted a torsion coil spring 53 for rotationally biasing the first lid 5 mounted on the cartridge main portion 2 in a direction of closing the front side of the cartridge main portion 2.

The second lid 7, rotated in association with movement of the first lid 6 for opening/closing the upper surface of the recess 10 formed on the front side of the cartridge main portion 2, has a major surface section 57 formed as an elongated plate having a length corresponding to the width of the front side of the cartridge main portion 2. On both lateral sides of the proximal portion of the second lid 7, positioned on the front side of the cartridge main portion 2 when the second lid is mounted on the main cartridge portion 2, there are formed pivot holes 58a, 58b passed through by the pivots 50a, 50b provided on the first lid 5. On the distal end of the second lid 7 opposite to its proximal end positioned towards the front side of the main cartridge portion 2 when the second lid is mounted on the main cartridge portion 2 are protuberantly formed engagement protrusions 59a, 59b designed for engaging with the rotation guide grooves 43a, 43b formed on both lateral sides of the main cartridge portion 2. At a mid portion of the inner surface of a major surface section 57 of the second lid 7 are protuberantly formed a pair of supporting pieces 60a, 60b for rotatably supporting the cover plate 7.

The cover plate 6 rotated in association with movement of the opening/closure mechanism 101 for covering the backside of the magnetic tape 8 pulled out on the front side of the main cartridge portion 2 has a major surface section 54 having a length substantially equal to the width of the tape-loading recess 10 and a width sufficient to cover the total width of the tape 8, pivots 55a, 55b protuberantly formed for facing both lateral sides of the proximal portion of the major surface section 54, and engagement protrusions 56a, 56b protuberantly formed for facing both lateral sides of the distal portion of the major surface section 54, as shown in FIGS. 1 through 3.

The second lid 7 of the opening/closure mechanism 101 is rotatably connected to the upper surface of the first lid 5, by having the pivots 50a, 50b supported in the pivot holes 58a, 58b of the first lid 5, for rotation about the pivots 50a, 50b as the center of rotation. In the assembled state of the cover plate 6 to the opening/closure mechanism 101, made up of the first lid 5 and the second lid 7, the magnetic tape 8 is extended between the cover plate 6 and the first lid 5 extending parallel to each other with a pre-set distance in-between.

The opening/closure mechanism 101, made up of the first lid 5 and the second lid 7, is combined with the upper half 4 of the main cartridge portion 2 by engaging the engagement protrusions 59a, 59b formed on both sides on the distal end of the major surface section 57 of the second lid 7 in the rotation guide grooves 43a, 43b formed on both lateral sides of the main cartridge portion 2. The second lid 7 is rotated about the pivots 50a, 50b of the rotating first lid 5 as the center of rotation, as the engagement protrusions 59a, 59b are moved within the rotation guide grooves 43a, 43b, for opening/closing the upper surface of the recess 10.

The first lid 5 of the opening/closure mechanism 101 is connected to the main cartridge portion 2 by having the pivots 51a, 51b engaged with the engagement recesses 44a, 44b of the upper half 4 for rotation about these pivots 51a, 51b as the center of rotation. When assembled to the main cartridge portion 2, the first lid 5 closes the entire area of the front side of the main cartridge portion 2. The pivots 51a, 51b of the first lid 5 are rotatably supported by both outer peripheral wall sections 11 of the lower half 3 abutted against the outer peripheral wall section 31 of the upper half 4 for rotation within the engagement recesses 44a, 44b. The first lid 5 is rotationally biased in a direction of closing the front side of the main cartridge portion 2 under the spring force of the torsion coil spring 53 loaded on the pivot 51b. When in the assembled state to the main cartridge portion 2, the lock pieces 52a, 52b of the first lid 5 face the unlock member inserting grooves 24a, 24b of the lower half 3. The lock pieces 52a, 52b are inter-engaged with the lock lever 71 constituting the lid lock mechanism assembled to the lower half 3 in a state of facing the unlock member inserting grooves 24a, 24b for maintaining the front side of the main cartridge portion 2 in the closed state.

When the opening/closure mechanism 101 is assembled in the main cartridge portion 2, the cover plate 6, rotatably combined with the inner surface of the major surface section 57 of the second lid 7 by having the pivots 55a, 55b on the proximal end of the cover plate fulcrumed by the supporting pieces 60a, 60b protuberantly formed on the inner surface of the second lid 7, is supported by the main cartridge portion 2, with the engagement protrusions 56a, 56b being inter-engaged with the rotation guide grooves 19a, 19b formed in the sidewall sections 17a, 17b formed on the lower half 3. When supported by the main cartridge portion 2, the cover plate 6 is positioned in the inside of the first lid 5 for closing the front side of the recess 10.

The second lid 7 is set in its position of closing the recess 10 by engagement protrusions, not shown, formed integrally on the inner surface of the major surface section 57, being inter-engaged with the engagement recesses 39a, 39b formed in the protruding pieces 38a, 38b of the upper half 4.

The magnetic tape 8, housed within the main cartridge portion 2, has at its distal end a transparent leader tape 61 connected thereto via a connection tape, not shown. The magnetic tape 8 is connected via both end leader tapes 61 to the tape reels 9a, 9b. The tape reels 9a, 9b, about which the magnetic tape 8 is wound, is made up of tubular hubs 62a, 62b, lower flanges 64a, 64b formed integrally with the outer periphery of the lower lateral surfaces of the hubs 62a, 62b, upper flanges 6a, 66b connected to the hubs 62a, 62b and a clamper 67 for securing the magnetic tape 8 in position. The tubular hubs 62a, 62b, on the outer peripheral surface of which the magnetic tape 8 is wound, are formed with reel driving shaft insertion holes 63a, 63b engaged by reel driving shafts of the recording/reproducing apparatus. The upper end faces of the center cores of the hubs 62a, 62b are provided with positioning protrusions used in combining the upper flanges 66a, 66b, while the peripheral surfaces of the hubs are formed with cut-outs engaged by the clamper 67. The radial ribs formed within the reel driving shaft insertion holes 63a, 63b are inter-engaged in rotation stop ribs formed on the outer peripheral surfaces of the reel driving shafts of the recording/reproducing apparatus.

The hubs 62a, 62b are integrally formed with 64a, 64b which are slightly smaller in diameter than the inside diameter of the reel housing section of the main cartridge portion 2. The entire outer peripheral surfaces of the lower flanges 64a, 64b are integrally formed with outer gears 65a, 65b engaged with reel lock levers 74a, 74b of the reel lock mechanism described above. The gears 65a, 65b are formed as ratchet wheels so that the tape reel 9 is locked in the magnetic tape reel-out direction by the inter-engaged reel lock levers 74a, 74b. The upper flanges 66a, 66b are combined with the upper surfaces of the hubs 62a, 62b in a state in which center positioning holes are engaged by mating with positioning protrusions, not shown. The hubs 62a, 62b are integrally combined with the upper flanges 66a, 66b in the assembled state by ultrasonic welding or the like. These upper flanges 66a and 66b are molded from a transparent synthetic resin material for enabling the state of the magnetic tape 8 wound on the hubs 62a, 62b to be seen through the window 34 of the upper half 4.

The tape reels 9a, 9b, constructed as described above, are rotatably housed within the tape reel housing sections 13a, 13b of the main cartridge portion 2 with the reel driving shaft insertion holes 63a, 63b facing the reel driving shaft inserting holes 14a, 14b of the lower half 3. The tape reels 9a, 9b are restricted in rotation in the magnetic tape reel-out direction by the reel lock mechanism as described above. The tape reels 9a, 9b are restricted in movement along the height by the reel retention springs 68a, 68b as described above.

Referring to FIG. 4, the magnetic tape 8 is drawn out from the supply-side tape reel 9b, positioned towards the right in FIG. 4, to outside of the main cartridge portion 2, via a right-side tape extraction aperture 15b, so as to be introduced via the recess on the front side of the main cartridge portion 2 and the left-side tape extraction aperture 15a into the main cartridge portion 2 and taken up on the tape guide 18a on the left-hand tape take-up side. The portion of the magnetic tape 8 traversing the recess 10 is extended through a spacing between the first lid 5 and the cover plate 8 so that it is covered by the first lid 5 and the cover plate 7.

The operation for loading the above-described tape cartridge 1 on the recording/reproducing apparatus is now explained.

When the tape cartridge 1 is loaded on the recording/reproducing apparatus, the reel driving shafts of the recording/reproducing apparatus are introduced via reel driving shaft inserting holes 14a, 14b of the main cartridge portion 2 so as to be engaged in reel driving shaft insertion openings 63a, 63b of the tape reels 9a, 9b. At this time, the lid unlock members of the recording/reproducing apparatus are intruded into the unlock member inserting grooves 24a, 24b for rotating the lock levers 71a, 71b against the bias of the thrusting springs 72a, 72b for unlocking the first lid 5 of the opening/closure mechanism 101 with respect to the main cartridge portion 2. The first lid 5, now released from lock by the lock levers 71a, 71b, is rotated by the lid opening member provided on the recording/reproducing apparatus intruded into the unlock member inserting grooves 24a, 24b, against the bias of the torsion coil spring 53. The first lid 5 is rotated counterclockwise in FIG. 3 about the pivots 51a, 51b, supported by the main cartridge portion 2, as the center of rotation. With the rotation of the first lid 5, the second lid 7, rotatably supported by the pivots 50a, 50b provided on the first lid 5, is also rotated in unison therewith.

At this time, the cover plate 6 is moved from the bottom surface of the main cartridge portion 2 towards its upper surface, as the cover plate 6 is rotated about the pivots 55a, 55b, a fulcrum provided by the supporting pieces 60a, 60b provided on the second lid 7. From the state facing the backside of the first lid 5, the cover plate 6 is rotated for overlying the second lid 7. When the first lid 5 opens the front side of the main cartridge portion 2, the tape end detection holes 49c provided in the rotary pieces 49a, 49b face the tape end detection holes 23a, 23b formed in the main cartridge portion 2.

By the operation of the opening/closure mechanism 101 and the cover plate 6, the front side of the main cartridge portion 2 and the recess are changed over from the closed state to the open state. The opened recess 10 is traversed by the magnetic tape 8 facing the outside.

When the tape cartridge 1 is loaded on the recording/ reproducing apparatus, the reel unlock member provided on the recording/reproducing apparatus is intruded into the unlock guide groove 28 for moving the reel unlock member 73 against the bias of the spring 76 for disengaging the reel lock levers 74a, 74b from the gears 65a, 65b of the tape reels 9a, 9b for enabling rotation of the tape reels 9a, 9b.

When the tape cartridge 1 is loaded on the recording/ reproducing apparatus and the recess 10 formed on the front side of the main cartridge portion 2 is opened for exposing the magnetic tape 8 extending on the front side of the main cartridge portion 2 to outside, the loading mechanism provided on the recording/reproducing apparatus is introduced into the recess 10 for pulling out the magnetic tape 8 from the recording/reproducing apparatus and loading the tape on a pre-set tape running route.

By the ejection operation, the magnetic tape 8 led onto the tape running route in the recording/reproducing apparatus is unloaded, while the operation of restoration of the opening/ closure mechanism 101 made up of the first lid 5 and the second lid 7 and the cover plate 6 is carried out and the reel lock mechanism is reset to its initial position. The tape cartridge 1, loaded into the recording/reproducing apparatus, is ejected in this state from the recording/reproducing apparatus. By the reel unlock member of the recording/ reproducing apparatus being receded from the unlock guide groove 28, the reel lock member is moved forwards under the spring force of the lock lever spring 76. By the operation of the reel lock member 73, the reel lock levers 74a, 74b are again engaged with the gears 65a, 65b of the tape reels 9a, 9b for locking the tape reels 9a, 9b in the magnetic tape reel-out direction. By the lid opening member and the lid unlock member of the recording/reproducing apparatus being receded from the lock member inserting grooves 24a, 24b, the opening/closure mechanism 101 and the cover plate 6 are reset to the initial state of opening the front side of the main cartridge portion 2. That is, the first lid 5 is rotated clockwise in FIG. 3, about the pivots 51a, 51b as the center of rotation, under the spring force of the torsion coil spring 53, in a direction of closing the front side of the main cartridge portion 2. That is, the second lid 7 is moved from the rear side towards the front side of the rotation guide grooves 43a, 43b engaged by the engagement protrusions 59a, 59b, that is towards the front side along the upper half 4, for rotating the cover plate 6. The cover plate 6 is moved from the upper portion towards the lower portion of the rotation guide grooves 19a, 19b provided on the sidewall sections 17a, 17b of the recess 10 engaged by the engagement protrusions 56a, 56b so as to be reset to the position overlying the backside of the magnetic tape 8 extended in the recess 10.

When the first lid 5 is rotated back to its initial position, the lock pieces 52a, 52b of the first lid 5 are inter-engaged by the lock levers 71a, 71b for maintaining the first lid 5 in the locked state. At this time, the reel driving shafts are receded from reel driving shaft inserting holes 14a, 14b.

Meanwhile, if unneeded force is exerted on the second lid 7 of the tape cartridge 1 by impact due to descent or by hand or finger, so that the second lid is deformed, the engagement protrusions 56a, 56b of the cover plate 6 supported by this second lid 7 tend to be dismounted from the rotation guide grooves 19a, 19b formed in the sidewall sections 17a, 17b of the recess 10. If the engagement protrusions 56a, 56b are detached from the rotation guide grooves 19a, 19b, the cover plate 6, the second lid 7 supporting the cover plate 6 or the first lid 5 supporting the second lid 7 become unable to be rotated, such that the front side of the main cartridge portion 2 cannot be opened or closed and hence the magnetic tape 8 cannot be pulled out.

Figure 8:
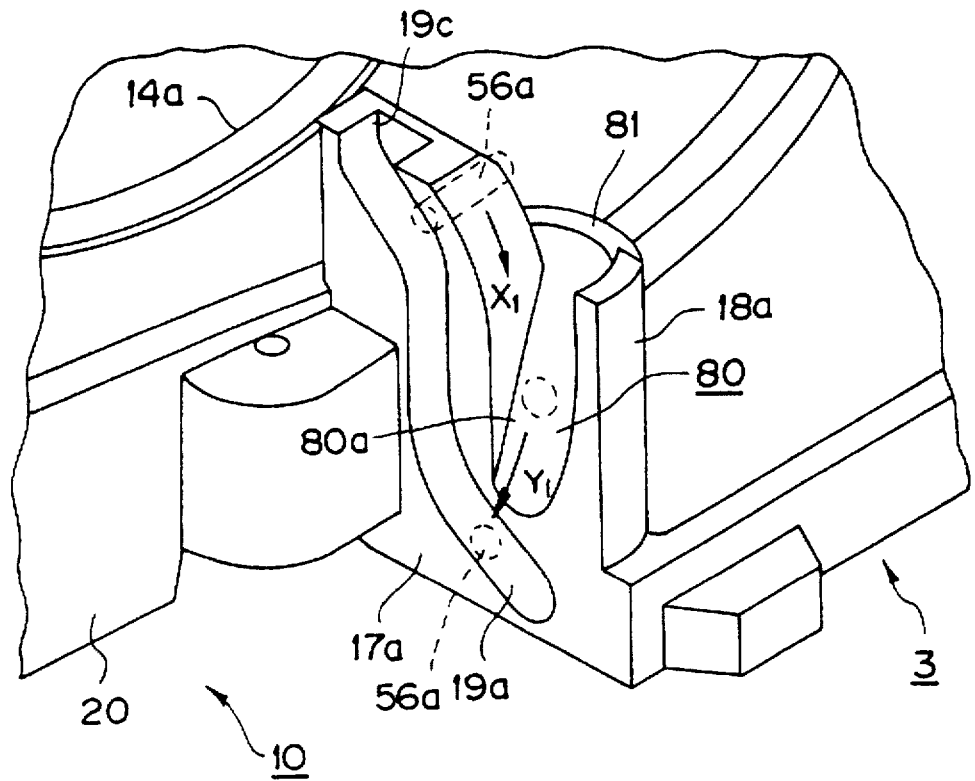
FIG. 8 is a perspective view showing a pull-in inlet formed in the lower half.

Thus, in the tape cartridge 1 of the present embodiment, the mutually facing sides of the sidewall sections 17a, 17b formed with the rotation guide grooves 19a, 19b are formed with pull-in inlet portions 80 for pull-in guiding the engagement protrusions 56a, 56b disengaged from the rotation guide grooves 19a, 19b into engagement with the rotation guide grooves 19a, 19b, as shown in FIG. 8.

If, with the present tape cartridge 1, the engagement protrusions 56a, 56b are disengaged from the rotation guide grooves 19a, 19b, the engagement protrusions 56a, 56b can be easily re-engaged with the rotation guide grooves 19a, 19b by exploiting the pull-in inlet portion 80 without the necessity of dismounting the main cartridge portion 2.

Figure 9:
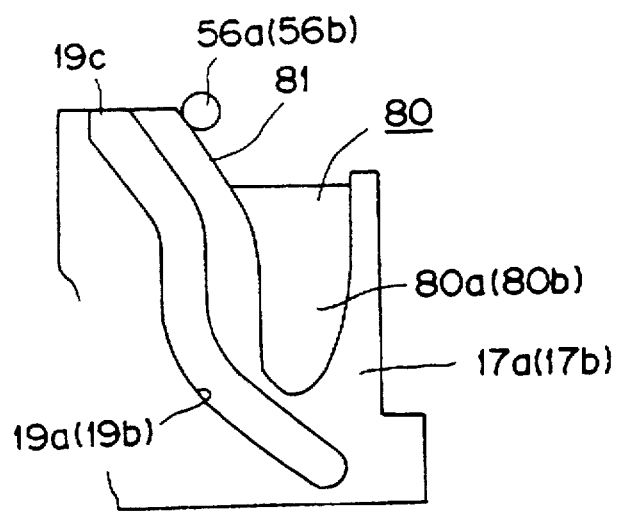
FIG. 9 is a side view showing the state in which an engagement protrusion of a cover plate is disengaged from the rotational guide grove formed in the cartridge main member.

Referring to FIGS. 8 and 9, the state of re-engaging the engagement protrusions 56a, 56b disengaged from the rotation guide grooves 19a, 19b in these grooves 19a, 19b is explained.

Meanwhile, since the state of inter-engagement of the rotation guide grooves 19a, 19b with the engagement protrusions 56a, 56b is transversely symmetrical on the sides of the sidewall sections 17a, 17b, only the rotation guide groove 19a and the engagement protrusion 56a are shown in FIGS. 8 and 9.

First, if the engagement protrusions 56a, 56b are disengaged from the rotation guide grooves 19a, 19b, the opening/closure mechanism 101 made up of the first lid 5 and the second lid 7 is rotated for opening the front side of the main cartridge portion 2. If the opening/closure mechanism 101 is rotated, the cover plate 6, supported by the second lid 7, is also rotated along with the second lid 7 and intruded into the recess 10 so as to be rotated from the position covering the backside of the magnetic tape 8 to a position overlying the main cartridge portion 2. The engagement protrusions 56a, 56b, disengaged from the rotation guide grooves 19a, 19b, are moved from the rotation guide grooves 19a, 19b to an upper end of the pull-in inlet portion 80 formed on the front surface of the main cartridge portion 2.

If the first lid 5 and the second lid 7, moved to the position of opening the front side of the main cartridge portion 2, are rotated in a direction of closing the front side of the main cartridge portion 2, the engagement protrusions 56a, 56b of the cover plate 6 are engaged with the groove-shaped upper end of the pull-in inlet portion 80 and moved towards the bottom surface of the main cartridge portion 2, in a direction indicated by arrow X1 in FIGS. 8 and 9, by being guided by a second inclined surface 81 formed on the upper end of the pull-in inlet portion 80. If the first lid 5 and the second lid 7 are rotated in a direction of closing the front side of the main cartridge portion 2, the engagement protrusions 56a, 56b of the cover plate 6 get to a first inclined surface 80a within the pull-in inlet portion 80, as shown in FIG. 10.

Figure 10:
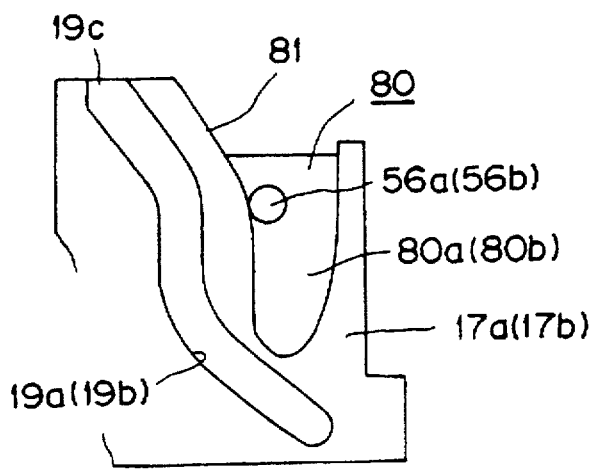
FIG. 10 is a side view showing the state in which the engagement protrusion disengaged from the rotational guide groove is engaged with the pull-in inlet portion.

If the engagement protrusions 56a, 56b are rotated from the state shown in FIG. 10 in a direction in which the first lid 5 and the second lid 7 close the front side of the main cartridge portion 2, the engagement protrusions 56a, 56b of the cover plate 6 are slid on the first inclined surface 80a in the pull-in inlet portion 80 in a direction indicated by arrow Y1 in FIG. 8. Since the first inclined surface 80a is inclined towards the opening edge of the rotation guide grooves 19a, 19b so that the depth of the groove-shaped pull-in inlet becomes shallower from the upper side towards the lower side of the pull-in inlet portion 80, the engagement protrusions 56a, 56b are moved to a position facing the opening edges of the rotation guide grooves 19a, 19b, which is the one end of the first inclined surface 80a, as shown in FIG. 11.

Figure 11:
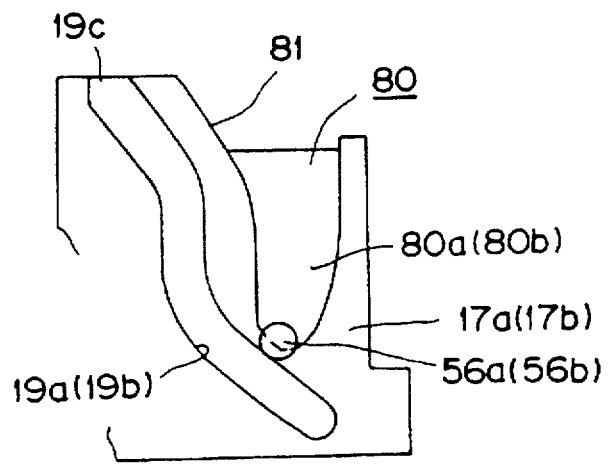
FIG. 11 is a side view showing the state n which the engagement protrusion of the cover plate engaged with the pull-in pull-in pull-in inlet portion is engaged with the rotational guide groove from the pull-in inlet portion.
Figure 12:
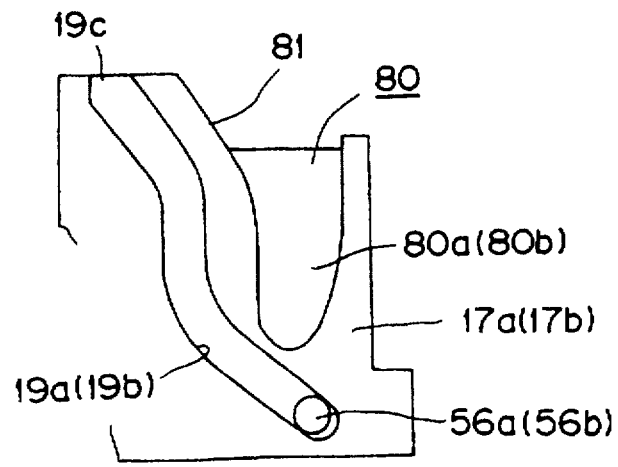
FIG. 12 is a side view showing the state in which the engagement protrusion of the cover plate is engaged with the rotational guide groove from the pull-in pull-in pull-in inlet portion.

If, with the engagement protrusions 56a, 56b of the cover plate 6 at the opening edges of the rotation guide grooves 19a, 19b, as shown in FIG. 11, the first lid 5 of the opening/closure mechanism 101 is compulsorily thrust in the direction of closing the front side of the main cartridge portion 2, the cover plate 6, formed of synthetic resin, is elastically deformed, such that the engagement protrusions 56a, 56b ride over the opening edges of the rotation guide grooves 19a, 19b into engagement with these grooves 19a, 19b, as shown in FIG. 12, thus correctly mounting the cover plate 6 on the main cartridge portion 2.

Thus, with the present embodiment of the tape cartridge 1, in which the pull-in inlet portion 80, extending as far as the opening edges of the rotation guide grooves 19a, 19b, is arranged next to the rotation guide grooves 19a, 19b, and the engagement protrusions 56a, 56b of the cover plate 6 are moved as far as the opening edges of the rotation guide grooves 19a, 19b, the engagement protrusions 56a, 56b of the cover plate 6 can be easily introduced into the rotation guide grooves 19a, 19b.

Figure 13:
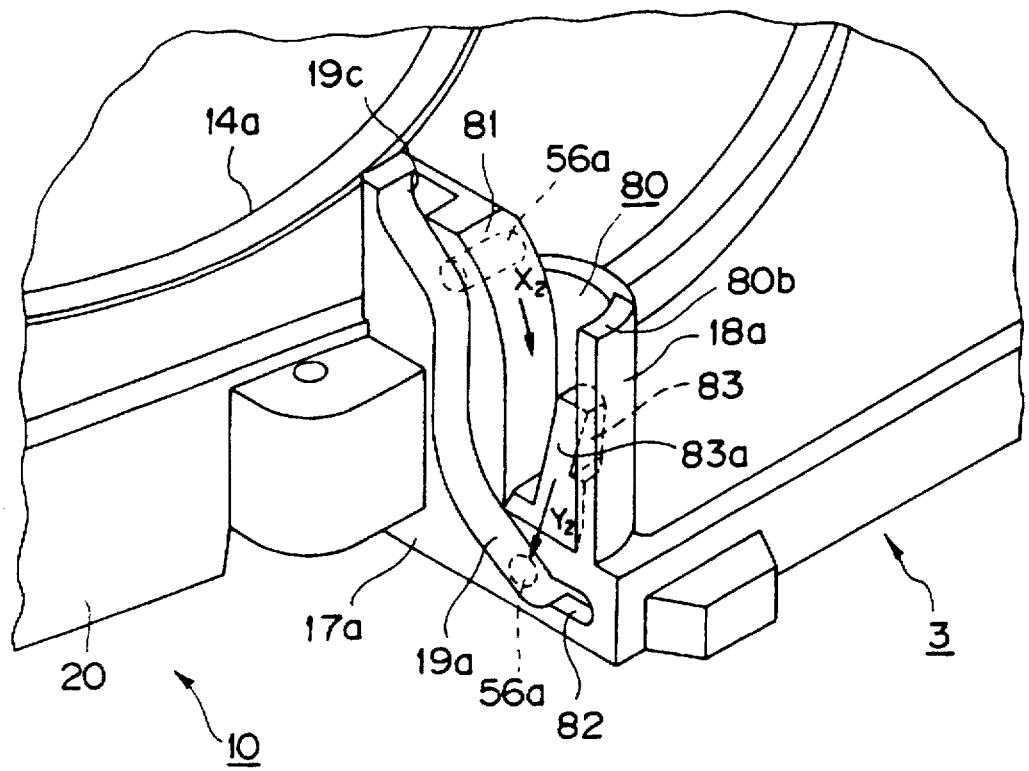
FIG. 13 is a perspective view showing a modified pull-in inlet portion formed on the lower half.
Figure 14:
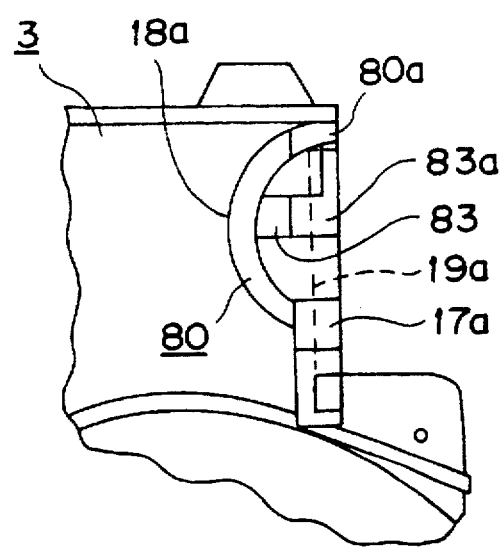
FIG. 14 is a plan view showing the pull-in inlet portion.
Figure 15:
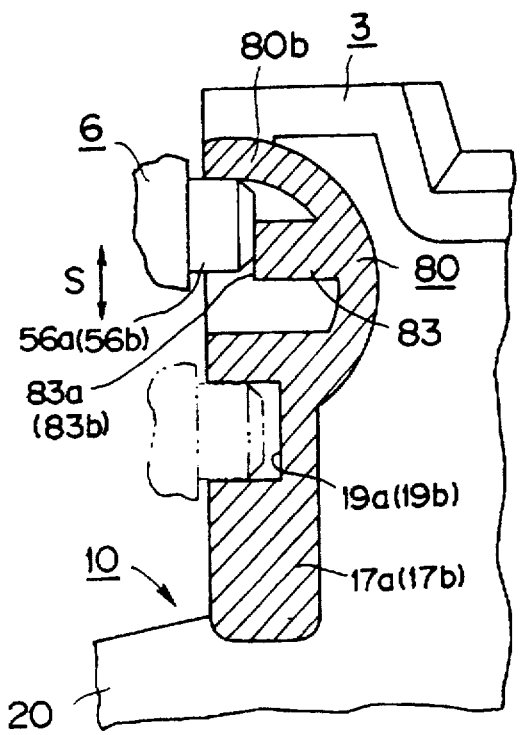
FIG. 15 is a cross-sectional view showing the state in which the engagement protrusion of the cover plate is engaged with the pull-in inlet portion shown in FIG. 13.

In the present embodiment of the tape cartridge 1, the pull-in inlet portion 80 having the first inclined surface 80a comprised of the first inclined surface 80a on the facing sidewall sections 17a, 17b of the recess 10 for guiding the engagement protrusions 56a, 56b of the cover plate 6 into engagement with the rotation guide grooves 19a, 19b, the pull-in inlet portion 80 is not limited to this specified embodiment but may also be configured as shown in FIGS. 13 through 15.

With the pull-in inlet portion 80, shown in FIGS. 13 and 14, a protrusion 83 is formed in the pull-in inlet portion 80 having a re-entrant cross-section, while a first inclined surface 83a is formed on a lateral surface of the protrusion 83 as a planar surface for guiding the engagement protrusions 56a, 56b of the cover plate 6 into engagement with the rotation guide grooves 19a, 19b.

The first inclined surface 83a, provided in the pull-in inlet portion 80, is provided facing a spacing defined between the one ends of the rotation guide grooves 19a, 19b facing the front side of the lower half 3 and the points of inflection of the rotation guide grooves 19a, 19b neighboring to these ends.

The pull-in inlet portion 80, shown in FIGS. 13 and 14, has a second inclined surface 81, having a curved surface above the protrusion 83 formed with the first inclined surface 83a for guiding the engagement protrusions 56a, 56b of the cover plate 6 disengaged from the rotation guide grooves 19a, 19b into engagement with the pull-in inlet portion 80.

The ends of the rotation guide grooves 19a, 19b facing the front side of the lower half 3 are formed with grooves 82 for preventing so-called sink otherwise produced during injection molding of the lower half 3 from the synthetic resin material. By forming the sink-preventative grooves 82, the sink in the thickened portion in the pull-in inlet portion 80 may be prohibited for enabling high-precision molding without producing distortion or deformation in the lower half 3.

By providing the protrusion 83 in the groove-shaped pull-in inlet portion 80, it becomes possible to form peripheral wall section 80b of the pull-in inlet portion 80, having its outer peripheral surface as the tape guides 18a, 18b, in a semi-circular shape of a uniform thickness, so that the inner surface of the opening edge side of the peripheral wall section 80b may be a surface substantially parallel to the axes of the engagement protrusions 56a, 56b, as shown in FIG. 15. By providing such peripheral wall section 80b, the engagement protrusions 56a, 56b engaged with the pull-in inlet portion 80 are restricted by the semi-circular peripheral wall section 80b, in its movement in the fore-and-aft direction of the lower half 3 in the direction indicated by arrow S in FIG. 15, which is the direction along the width of the pull-in inlet portion 80, as shown in FIG. 15, thus enabling the engagement protrusions 56a, 56b to be reliably guided on the first inclined surface 83a. That is, the peripheral wall section 80b may be used as a movement restricting portion for restricting the movement of the engagement protrusions 56a, 56b engaged with the pull-in inlet portion 80.

With the tape cartridge having the pull-in inlet portion 80 shown in FIGS. 13 and 14, if the engagement protrusions 56a, 56b are disengaged from the rotation guide grooves 19a, 19b, the opening/closure mechanism 101 made up of the first lid 5 and the second lid 7 is rotated for opening the front side of the main cartridge portion 2. If the opening/closure mechanism 101 is rotated, the cover plate 6 supported by the second lid 7 is also rotated along with the second lid 7 and intruded into the recess 10. The cover plate 6 is rotated from the position covering the backside of the magnetic tape 8 to a position overlying the main cartridge portion 2. The engagement protrusions 56a, 56b disengaged from the rotation guide grooves 19a, 19b are moved to the upper end of the pull-in inlet portion 80. If the first lid 5 and the second lid 7, moved to the position opening the front side of the main cartridge portion 2, are rotated to the position closing the front side of the main cartridge portion 2, the engagement protrusions 56a, 56b of the cover plate 6 are engaged with the upper end of the groove-shaped pull-in inlet portion 80 and moved towards the bottom surface of the main cartridge portion 2, as indicated by arrow X2 in FIG. 13, by being guided by the second inclined surface 81 formed at the upper end within the pull-in inlet portion 80. If the first lid 5 and the second lid 7 are moved further in a direction of closing the front side of the main cartridge portion 2, the engagement protrusions 56a, 56b of the cover plate 6 get to a first inclined surface 83a formed on the surface of the protrusion 83 within the pull-in inlet portion 80. If the first lid 5 and the second lid 7 are moved further in the direction of closing the front side of the main cartridge portion 2, the engagement protrusions 56a, 56b of the cover plate 6 are moved on the inclined surface 83a formed on the surface of the protrusion 83 in a direction of arrow Y2 in FIG. 13 as far as a position facing the opening edges of the rotation guide grooves 19a, 19b corresponding to the one end of the first inclined surface 83a. If now the first lid 5 of the opening/closure mechanism 101 is compulsorily thrust in a direction of closing the front side of the main cartridge portion 2, the cover plate 6 formed of synthetic resin is elastically deformed, with the engagement protrusions 56a, 56b riding over the opening edges of the rotation guide grooves 19a, 19b and engaged with the rotation guide grooves 19a, 19b for correctly mounting the cover plate 6 on the main cartridge portion 2.

It is also possible to provide plural plate-shaped inclined pieces 85b parallel to one another within the groove-shaped pull-in inlet portion 80 and to form first inclined surfaces 85a on the surfaces of the plate-shaped inclined pieces 85b. In this case, the ends of the first inclined surfaces 85a are similarly positioned for facing the spacing between the ends of the rotation guide grooves 19a, 19b facing the front side of the lower half 3 and the points of inflection of the rotation guide grooves 19a, 19b neighboring to these ends.

Figure 16:
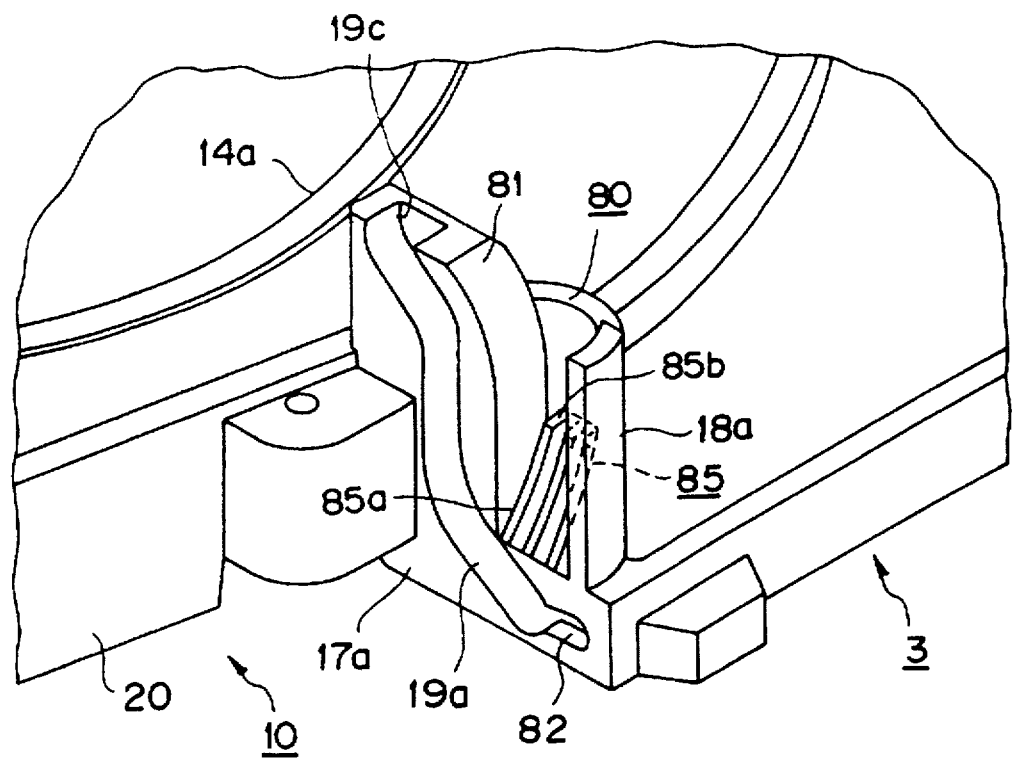
FIG. 16 is a perspective view showing another modified pull-in inlet portion formed on the lower half.
Figure 17:
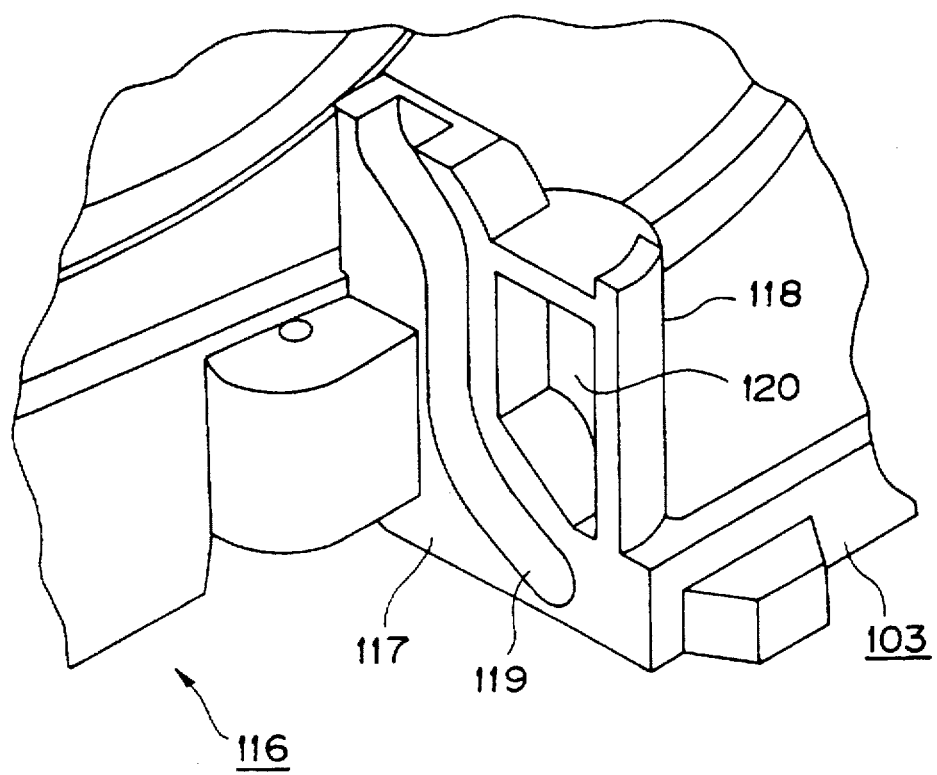
FIG. 17 is a rotational guide groove for guiding the rotational direction of the cover plate provided on a conventional tape cartridge.

In the present embodiment, shown in FIG. 16, the peripheral wall section 80b constituting the pull-in inlet portion 80 may be formed in the shape of a semicircle having a uniform thickness, while the inner surface of the opening edge of the peripheral wall section 80b may be formed as a surface substantially parallel to the axial direction of the engagement protrusions 56a, 56b engaged with the pull-in inlet portion 80. Thus the engagement protrusions 56a, 56b, engaged with the pull-in inlet portion 80, are restricted by the semicircular peripheral wall section 80b in the movement thereof in the fore-and-aft direction of the lower half 3 which is the direction along the width of the pull-in inlet portion 80, thereby positively guiding the engagement protrusions 56a, 56b on the first inclined surface 85a.

It should be noted that, if the first inclined surface 85a is configured for supporting the the engagement protrusions 56a, 56b of the cover plate 6 and for sliding these protrusions onto the first inclined surface 85a, it is possible to change the number, distance of the mounting position of the plate-shaped inclined pieces 85b as appropriate.

Although the above-described opening/closure mechanism 101 for opening/closing the front side of the main cartridge portion 2 is made up of the first lid 5 and the second lid 7, it may also be constituted solely by the first lid 5. In this case, the cover plate 7 is rotatably supported by the first lid 5 and is supported by the main cartridge portion 2 with the engagement protrusions 56a, 56b engaged with the rotation guide grooves 19a, 19b provided in the main cartridge portion 2

The digital cartridge 1 according to the present invention is not limited to the magnetic tape 8 and may be widely applied to any cartridge housing a tape-shaped recording medium for recording information signals. The digital cartridge 1 of the present invention may also be a cartridge housing a cleaning tape configured for cleaning recording and/or reproducing means, such as a magnetic head, mounted within the recording/reproducing apparatus, in which is loaded a tape cartridge housing a tape-shaped recording medium for recording information signals.

What is claimed is:

1. A tape cartridge comprising:

a main cartridge portion for rotatably housing a pair of tape reels around each of which a tape is wound, said main cartridge portion having on a front side a recess into which is intruded a tape pull-out mechanism for pulling out said tape from said main cartridge portion;

an opening/closure mechanism rotatably supported on said main cartridge portion for opening/closing said recess;

a cover plate rotatably supported by said main cartridge portion and rotated in response to movement of said opening/closure mechanism for covering a backside of said tape pulled out into said recess; and pull-in inlet means formed on at least one of mutually facing sidewall sections of said main cartridge portion at said recess, said pull-in inlet means having a rotation guide groove engaged by an engagement protrusion formed on a free end of said cover plate, said rotation guide groove for guiding a rotational locus of movement of said cover plate and said pull-in inlet means having an inclined surface for guiding the engagement protrusion of said cover plate into engagement with the rotation guide groove.

2. The tape cartridge as claimed in claim 1 wherein said opening/closure mechanism includes a first lid rotatably supported by said cartridge main portion for opening/closing said recess and a second lid rotatably supported by said first lid for opening/closing an upper side of said recess.

3. The tape cartridge as claimed in claim 1 wherein said rotation guide groove is formed as a meandering curve having a plurality of points of inflection with respective variable radii of curvatures and wherein one end of said inclined surface of said pull-in inlet means facing an opening edge of said rotation guide groove is formed between one of said rotation guide groove facing the front side of the cartridge main portion and one of said points of inflection adjacent to said end.

4. The tape cartridge as claimed in claim 1 wherein said rotation guide groove is formed with a secondary groove for preventing sink from being formed during molding of the cartridge main portion from synthetic resin, said secondary grove being formed in continuation to one end of said rotation guide groove.

5. The tape cartridge as claimed in claim 1 wherein said rotation guide groove has a plurality of inclined surfaces having different respective directions of inclination.

6. The tape cartridge as claimed in claim 5 wherein said inclined surfaces include a first inclined surface inclined substantially toward the front side of the cartridge main portion and a second inclined inwardly toward said recess of said cartridge main portion.

7. The tape cartridge as claimed in claim 1 wherein said pull-in inlet means comprises movement restricting means for restricting movement of the engagement protrusion of the cover plate in a direction substantially normal to the direction of the movement thereof on said inclined surface.

* * * * *